United States Patent
Eriksson et al.

(10) Patent No.: US 11,098,624 B2
(45) Date of Patent: Aug. 24, 2021

(54) METHOD OF COMPACTING ASH DEPOSITED IN A PARTICULATE FILTER BY PROVIDING A LOW-TEMPERATURE MELTING SALT TO SAID FILTER

(71) Applicant: Scania CV AB, Södertälje (SE)

(72) Inventors: Henrik Eriksson, Södertälje (SE); Francesco Regali, Bromma (SE); Mattias Berger, Mariefred (SE); David Raymand, Uppsala (SE); Ulf Nylèn, Rönninge (SE); Joel Carlsson, Luleå (SE)

(73) Assignee: Scania CV AB, Södertälje (SE)

( * ) Notice: Subject to any disclaimer, the term of this patent is extended or adjusted under 35 U.S.C. 154(b) by 0 days.

(21) Appl. No.: 16/477,313

(22) PCT Filed: Jan. 23, 2018

(86) PCT No.: PCT/SE2018/050049
§ 371 (c)(1),
(2) Date: Jul. 11, 2019

(87) PCT Pub. No.: WO2018/143867
PCT Pub. Date: Aug. 9, 2018

(65) Prior Publication Data
US 2020/0032684 A1 Jan. 30, 2020

(30) Foreign Application Priority Data
Feb. 3, 2017 (SE) .................................. 1750091-9

(51) Int. Cl.
*F01N 3/02* (2006.01)
*B01D 46/00* (2006.01)
(Continued)

(52) U.S. Cl.
CPC ....... *F01N 3/0232* (2013.01); *B01D 46/0061* (2013.01); *B01D 46/04* (2013.01); *B01D 2279/30* (2013.01); *F01N 2610/01* (2013.01)

(58) Field of Classification Search
CPC .............. F01N 3/0232; F01N 2610/01; B01D 46/0061; B01D 46/04; B01D 2009/009;
(Continued)

(56) References Cited

U.S. PATENT DOCUMENTS 3,634,242 A * 1/1972 Metro ....................... C10L 1/22
508/524
3,647,358 A * 3/1972 Greenberg ................ F01N 3/04
60/299
(Continued)

FOREIGN PATENT DOCUMENTS

CN 88102022 A 9/1988
CN 1043336 A 6/1990
(Continued)

OTHER PUBLICATIONS

Scania CV AB, International Application No. PCT/SE2018/050049, International Search Report, dated Mar. 13, 2018.
(Continued)

*Primary Examiner* — Thai Ba Trieu
(74) *Attorney, Agent, or Firm* — Moore & Van Allen PLLC; W. Kevin Ransom

(57) ABSTRACT

The present disclosure relates to a method of compacting an ash deposited in a particulate filter for a vehicle exhaust gas system, the method includes the steps of: a) providing a low-temperature melting salt to the particulate filter, thereby forming a mixture of the ash and the low-temperature melting salt: and b) heating the particulate filter to a compaction temperature, thereby compacting the mixture of the ash and the low-temperature melting salt. The disclosure
(Continued)

further relates to engine oils, dosage products, engine systems and vehicles for implementing such a method.

15 Claims, 6 Drawing Sheets

(51) Int. Cl.
 *B01D 46/04* (2006.01)
 *F01N 3/023* (2006.01)
(58) Field of Classification Search
 CPC ...... B01D 2279/30; B01D 2252/20494; B01D 71/40; B01D 2251/60; B01D 2251/80
 USPC ............... 60/295, 297; 422/177; 423/239.1; 429/49; 508/306, 524
 See application file for complete search history.

(56) References Cited

U.S. PATENT DOCUMENTS

| | | | | |
|---|---|---|---|---|
| 3,754,074 | A * | 8/1973 | Grantham | F01N 3/0842 60/297 |
| 3,899,322 | A * | 8/1975 | Yosim | C22B 7/001 75/402 |
| 4,515,758 | A * | 5/1985 | Domesle | F01N 3/2882 60/297 |
| 5,487,763 | A | 1/1996 | More et al. | |
| 5,522,905 | A | 6/1996 | Krutzsch et al. | |
| 5,972,852 | A * | 10/1999 | Robson | C10M 105/54 508/306 |
| 6,013,599 | A * | 1/2000 | Manson | B01D 53/944 502/325 |
| 6,462,001 | B1 | 10/2002 | Kenbeek | C10M 105/42 508/492 |
| 6,517,948 | B1 * | 2/2003 | Grant | C08L 67/02 428/480 |
| 6,764,664 | B2 * | 7/2004 | Zhang | B01D 53/945 423/213.2 |
| 7,297,656 | B2 * | 11/2007 | Zhang | B01D 53/945 502/339 |
| 8,017,550 | B2 * | 9/2011 | Chao | B01D 53/64 502/417 |
| 8,609,580 | B2 * | 12/2013 | Chao | B01D 53/64 502/417 |
| 9,500,158 | B1 * | 11/2016 | Anthony | F01B 17/04 |
| 10,530,011 | B1 * | 1/2020 | MacKenzie | H01M 10/0565 |
| 2003/0101717 | A1 | 6/2003 | Dittler et al. | |
| 2003/0182847 | A1 | 10/2003 | Katafuchi | |
| 2004/0074230 | A1 * | 4/2004 | Guinther | C10L 1/1814 60/295 |
| 2004/0126287 | A1 * | 7/2004 | Zhang | B01D 53/945 422/177 |
| 2006/0177367 | A1 * | 8/2006 | Li | B01D 53/949 423/239.1 |
| 2006/0266023 | A1 | 11/2006 | Boegner et al. | |
| 2008/0311380 | A1 * | 12/2008 | Agrawal | C08L 63/00 428/323 |
| 2009/0199539 | A1 * | 8/2009 | Maunula | F01N 3/021 60/274 |
| 2011/0282597 | A1 * | 11/2011 | Traversa | F01M 11/10 702/50 |
| 2012/0186993 | A1 * | 7/2012 | Huang | B01D 53/1456 205/687 |
| 2013/0004586 | A1 * | 1/2013 | Vachon | A61K 33/38 424/618 |
| 2013/0199918 | A1 * | 8/2013 | Jones | C02F 1/44 201/6 |
| 2014/0116028 | A1 | 5/2014 | Sappok et al. | |
| 2015/0119231 | A1 * | 4/2015 | Anderson | B01J 20/3282 502/5 |
| 2016/0045841 | A1 * | 2/2016 | Kaplan | B01D 53/48 429/49 |
| 2016/0047284 | A1 * | 2/2016 | Turgeon | F01N 3/0293 60/605.1 |
| 2016/0189806 | A1 * | 6/2016 | Cheatham, III | G21C 1/22 376/213 |
| 2018/0354807 | A1 * | 12/2018 | Harada | B01D 53/62 |
| 2019/0040777 | A1 * | 2/2019 | Eriksson | F01N 3/0293 |

FOREIGN PATENT DOCUMENTS

| | | |
|---|---|---|
| CN | 1279149 C | 10/2006 |
| CN | 105802713 A | 7/2016 |
| EP | 0377122 A1 | 7/1990 |
| EP | 1047755 A1 | 11/2000 |
| EP | 1308606 A2 | 5/2003 |
| EP | 1411106 A1 | 4/2004 |
| WO | 9936488 A1 | 7/1999 |

OTHER PUBLICATIONS

Scania CV AB, International Application No. PCT/SE2018/050049, Written Opinion, dated Mar. 13, 2018.
Scania CV AB, Swedish Application No. 1750091-9, Office Action, dated Sep. 27, 2017.
Santa Cruz Biotechnology, Manganese (III) phosphate hydrate: sc-269386, Oct. 11, 2011.
Scania CV AB, International Application No. PCT/SE2018/050049, International Preliminary Report on Patentability, dated Aug. 6, 2019.
Scania CV AB, European Application No. 18747224.6, Extended European Search Report, dated Jul. 2, 2020.
Scania CV AB, Chinese Application No. 201880008674.2, First Office Action, dated Oct. 22, 2020.

* cited by examiner

METHOD OF COMPACTING ASH DEPOSITED IN A PARTICULATE FILTER BY PROVIDING A LOW-TEMPERATURE MELTING SALT TO SAID FILTER

CROSS-REFERENCE TO RELATED APPLICATIONS

This application is a national stage application (filed under 35 § U.S.C. 371) of PCT/SE2018/050049, filed Jan. 23, 2018 of the same title, which, in turn, claims priority to Swedish Application No. 1750091-9 filed Feb. 3, 2017; the contents of each of which are hereby incorporated by reference.

FIELD OF THE INVENTION

The present disclosure relates in general to methods of compacting ash deposited in a particulate filter for a vehicle exhaust gas system. The present disclosure further relates to engine oils, dosage products, engine systems and vehicles for implementing such methods.

BACKGROUND OF THE INVENTION

An internal combustion engine combusts a fuel and air mixture in order to generate a driving moment, which powers for example a heavy vehicle, such as a bus or truck. The combustion process generates exhaust gases which exit the engine and are transferred to an exhaust gas system. The exhaust gases from a lean diesel combustion engine mainly comprise nitrogen oxide gases ($NO_x$), carbon dioxide ($CO_2$), carbon monoxide (CO), water ($H_2O$), hydrocarbon (HC), and particulates. The exhaust gas particulates comprise soot, i.e. carbon-rich particles resulting from the incomplete combustion of fuel, and ash, i.e. non-combustible inorganic matter deriving primarily from additives in the engine lubrication oil and impurities in the fuel.

The exhaust gas system typically includes one or more particulate filters, for example a diesel particulate filter (DPF) such as a catalysed soot filter (CSF), in order to trap particulates in the exhaust gas. Additional catalysts may also be provided in the exhaust gas system, such as a diesel oxidation catalyst (DOC), a selective catalytic reduction (SCR) catalyst, and an ammonia slip catalyst (ASC).

The diesel particulate filter accumulates ash and soot particulate matter during operation, leading to clogging of the filter and increased exhaust back-pressure if not remedied. Combustible matter, i.e. soot, may be removed by regeneration of the particulate filter. In markets where fuel quality is highly regulated, the particulate filter can be provided with a coating of an oxidation catalyst (catalysed DPF, cDPF) and/or have a DOC arranged upstream. These catalysts oxidize NO to $NO_2$, which is a highly effective oxidant for soot. The presence of these catalysts therefore enables the oxidation of soot at relatively low temperatures, allowing continuous regeneration of the filter under normal operating conditions. This is known as passive regeneration.

The incombustible matter, commonly referred to as ash, is accumulated as a low-density deposit in the inlet channels of a wall-flow particulate filter. If left unremedied, the accumulated ash will fill the particulate filter and cause excessive back-pressure. Accumulated ash cannot easily be removed from the particulate filter, without replacing the filter. There are however methods of compacting and redistributing the ash further back in the flow path through the filter, thus reducing the pressure drop across the filter and allowing a longer service life prior to replacing the filter.

The density and distribution of ash is affected by flow and temperature conditions in the particulate filter. At conditions used in active regeneration, the ash is sintered, leading to a much more compact ash and redistributing the ash deeper within the inlet channels of the particulate filter. Such compaction and redistribution may be achieved either by regulating the engine to provide higher exhaust temperatures, or by providing fuel to the diesel oxidation catalyst, which in an exothermic reaction oxidizes the fuel, thus raising the exhaust temperature downstream of the oxidation catalyst.

It is not always feasible or desirable to compact and redistribute ash by subjecting the particulate filter to such high temperatures. Obtaining the high temperatures required leads to increased fuel consumption, and the high temperatures cause excessive wear of exhaust system components. Moreover, some exhaust system components, such as the SCR catalyst, may not be designed to tolerate such high temperatures. There is therefore a general need for methods of preventing ash from clogging a particulate filter without using excessively high temperatures.

US20030101717 discloses a diesel particle filter having an impaction surface such that adhesion of non-combustible ash particles occurs on this surface only with such binding forces that the ash particles can be removed from the impaction surface with a fluid and/or by vibrational effects. An additive functioning to lower the adhesion of the ash particles to one another and/or to the impaction-side surface of the diesel particle filter may be added to one or more of a fuel, a motor oil, an intake air and/or an exhaust gas flow, during the operation of the diesel engine.

There remains a need for improved methods of preventing ash from clogging a particulate filter.

SUMMARY OF THE INVENTION

The inventors of the present invention have identified shortcomings in the prior art. They have recognised that the low density packing and unfavorable distribution of ash in the particulate filter leads to premature plugging of the filter. This leads to the need to either over-dimension filters or to frequently service/replace them. Compaction and redistribution can assist in reducing the pressure drop over the particulate filter, but attainment of such compaction and redistribution requires subjecting the particulate filter to high temperatures. Subjecting the particulate filter to such high temperatures requires excessive energy expenditure and may cause wear or even premature failure of exhaust system components. Prior art methods for addressing ash plugging may require specially coated or treated surfaces and are not applicable to regular particulate filters lacking such surfaces.

It is therefore an object of the present invention to provide a means and method of compacting the ash deposited in a particulate filter that may be performed at lower temperatures using regular particulate filters without specially adapted surfaces.

These objects are achieved by a method of compacting an ash deposited in a particulate filter for a vehicle exhaust gas system according to the appended claims. The method comprises the steps of:

a) providing a low-temperature melting salt to the particulate filter, thereby forming a mixture of the ash and the low-temperature melting salt: and b) bringing the particulate filter to a compaction temperature, thereby compacting the mixture of the ash and the low-temperature melting salt.

It has been discovered that adding small quantities of a low-temperature melting salt to engine ash allows the ash to be compacted and redistributed at much lower temperatures than is typically required. By ensuring that small quantities of low-temperature melting salt are mixed with the ash and brought to the required compaction temperature, the pressure drop across a particulate filter can be decreased. This means that the active service life prior to replacement of the particulate filters may be extended, or smaller dimensioned filters that have the same service life may be used. Reducing the pressure drop across a filter in use in a vehicle may also significantly reduce the fuel consumption of the vehicle.

By bringing the particulate filter to a compaction temperature it is meant that the temperature of the filter is brought to a temperature equal to or above a minimum compaction temperature required to achieve compaction of the mixture of the ash and the low-temperature melting salt. The particulate filter may be brought to a compaction temperature by routine operation of the vehicle. Alternatively, the particle filter may be brought to a compaction temperature by active measures to heat the particulate filter, such as raising the temperature of the exhaust stream or utilizing heating elements in the housing of the particulate filter.

The step a) of providing a low-temperature melting salt to the particulate filter may be achieved by dosing the low-temperature melting salt to an engine oil, dosing the low-temperature melting salt to a fuel, dosing the low-temperature melting salt to an intake air, and/or dosing the low-temperature melting salt to the vehicle exhaust gas system upstream of the particulate filter. Therefore, there is an abundance of different means of delivering the low-temperature melting salt to the particulate filter, many of which do not necessarily require significant reengineering of the engine system components.

The low-temperature melting salt may be dosed as a powder, a solid-in-solid dispersion, a solid-in-liquid dispersion or a molten salt. This allows delivery of the salt to the particulate filter in a convenient manner.

The low-temperature melting salt may have a melting point of from 100° C. to 1000° C. This is much lower than the principle component of ash deriving from lubricant oil, calcium sulfate (m.p. 1460° C.), and should ensure that compaction is obtained at temperatures much lower than is commonly the case.

The low-temperature melting salt may comprise at least one cationic component and at least one anionic component, wherein the at least one cationic component may be lithium ($Li^+$), sodium ($Na^+$), potassium ($K^+$), rubidium ($Rb^+$), caesium ($Cs^+$), calcium ($Ca^{2+}$) or ammonium ($NH_4^+$) ion, and the at least one anionic component may be fluoride ($F^-$), chloride ($Cl^-$), bromide ($Br^-$), iodide ($I^-$), nitrate ($NO_3^-$), or sulfate ($SO_4^{2-}$) ion. The low-temperature melting salt may comprise alkali metal halide salts. Such alkali metal halides are cheap, abundant and readily available.

The low-temperature melting salt may be provided to the particulate filter in an amount of from 0.2 weight % to 20 weight %, relative to the dry weight of uncompacted ash deposited in the particulate filter. This ensures sufficient salt to provide the desired compaction effect while avoiding over-deposition of inorganic matter on the particulate filter.

The compaction temperature may be from 300° C. to 700° C., preferably from 400° C. to 500° C. Such temperatures may be low enough to avoid excessive thermal wear of exhaust system components.

The present invention also concerns the use of a low-melting salt for compacting an ash deposited in a particulate filter for a vehicle exhaust gas system. Depending on the low-temperature melting salt used, the compaction temperature may be routinely achieved during normal operation of the vehicle.

According to a further aspect, the objects of the invention are achieved by an engine oil according to the appended claims. The engine oil comprises a base lubrication oil and a low-temperature melting salt for densifying an ash deposited in a particulate filter for a vehicle exhaust gas system. By using an engine oil comprising the low-temperature melting salt, reengineering of the vehicle engine system may be avoided and the invention may be applied to vehicles currently in operation.

The base lubrication oil may be a multi-grade synthetic oil. This maintains compatibility with other high-performance engines on the market.

The low-temperature melting salt in the engine oil may comprise at least one cationic component and at least one anionic component, wherein the at least one cationic component is lithium ($Li^+$), sodium ($Na^+$), potassium ($K^+$), rubidium ($Rb^+$), caesium ($Cs^+$), calcium ($Ca^{2+}$) or ammonium ($NH_4^+$) ion, and the at least one anionic component is fluoride ($F^-$), chloride ($Cl^-$), bromide ($Br^-$), iodide ($I^-$), nitrate ($NO_3^-$), or sulfate ($SO_4^{2-}$) ion. The low-temperature melting salt in the engine oil may comprise alkali metal halide salts. Such alkali metal halides are cheap, abundant and readily available.

According to another aspect of the present invention, the objects of the invention may be achieved by a low-temperature melting salt dosage product according to the appended claims. The low-temperature melting salt dosage product comprises a low-temperature melting salt dispersed in a solid matrix. Using such a dosage product, the salt may be dosed to conventional oils and/or fuels, meaning that the invention may be implemented using unmodified vehicles that in turn use unmodified oils and/or fuels. This provides significant logistical benefits and may assist in market acceptance.

The solid matrix may be a controlled-release matrix arranged to controllably release the low-temperature melting salt when submerged in an engine oil at temperatures of 50° C. and over, preferably at temperatures of 100° C. and over. This allows for an optimal concentration of the salt at all times whilst minimizing the need to periodically provide additives to the engine oil.

The low-temperature melting salt in the dosage product may comprise at least one cationic component and at least one anionic component, wherein the at least one cationic component is lithium ($Li^+$), sodium ($Na^+$), potassium ($K^+$), rubidium ($Rb^+$), caesium ($Cs^+$), calcium ($Ca^{2+}$) or ammonium ($NH_4^+$) ion, and the at least one anionic component is fluoride ($F^-$), chloride ($Cl^-$), bromide ($Br^-$), iodide ($I^-$), nitrate ($NO_3^-$), or sulfate ($SO_4^{2-}$) ion. The low-temperature melting salt in the dosage product may comprise alkali metal halide salts. Such alkali metal halides are cheap, abundant and readily available.

According to yet a further aspect of the present invention, the objects of the invention are achieved by an engine system for a vehicle according to the appended claims. The engine system comprises:

an internal combustion engine arranged to be operated by combustion of a fuel in intake air, arranged to be lubricated by means of an engine oil, and arranged to generate exhaust gases upon combustion of a fuel;

a fuel supply system arranged to convey the fuel to the internal combustion engine;

an air intake system arranged to convey intake air to the internal combustion engine;

a lubrication system arranged to convey the engine oil to the internal combustion engine;

an exhaust gas system arranged to convey the exhaust gases from the internal combustion engine, the exhaust gas system comprising a particulate filter for trapping ash and/or soot dispersed in the exhaust gases; and a salt dosing unit arranged to dose a low-temperature melting salt to the fuel and/or the engine oil and/or the intake air and/or the exhaust gas system upstream of the particulate filter.

The use of an engine system with a salt dosing unit allows for a more precise dosing of the low temperature melting salt and permits the salt only to be dosed under specific circumstances, e.g. prior to an active regeneration of the particulate filter or when the pressure drop across the filter becomes excessively high.

The salt dosing unit may be arranged to dose the low-temperature melting salt as a powder, a solid-in-solid dispersion, a solid-in-liquid dispersion or a molten salt. Thus, a variety of well-characterised and robust dosing technologies may be used.

According to yet another aspect of the present invention, the objects of the invention are achieved by a vehicle comprising an engine oil, and/or a low-temperature melting salt dosage product and/or an engine system as disclosed herein.

Further objects, advantages and novel features of the present invention will become apparent to one skilled in the art from the following detailed description.

BRIEF DESCRIPTION OF THE DRAWINGS

For a fuller understanding of the present invention and further objects and advantages of it, the detailed description set out below should be read together with the accompanying drawings, in which the same reference notations denote similar items in the various diagrams, and in which.

DETAILED DESCRIPTION

Figure 1:
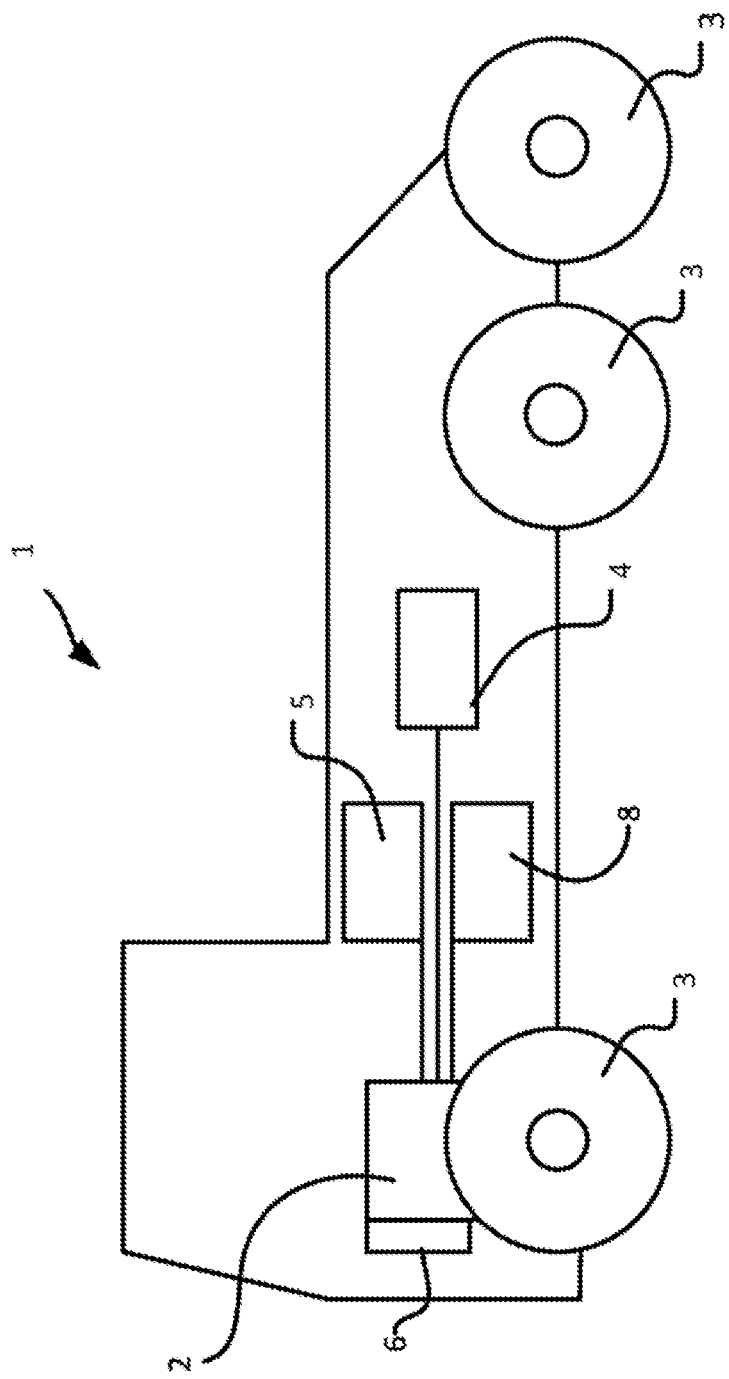
FIG. 1 schematically illustrates a side view of a vehicle comprising an engine system.

The present invention is based on the insight by the inventors that compaction and redistribution of ash in the particulate filter of a vehicle may be assisted by providing one or more auxiliary salts mixed in the ash. These auxiliary salts have more favorable compaction and redistribution properties than typical motor ash, and aid the typical ash in compacting and redistributing within the particulate filter. This results in lower exhaust temperatures being required for compaction of the low-temperature melting salt/ash mixture, meaning that compaction may be achieved under milder conditions than typically required.

The method of compacting deposited ash comprises the steps of:

a) providing a low-temperature melting salt to the particulate filter, thereby forming a mixture of the ash and the low-temperature melting salt; and b) bringing the particulate filter to a compaction temperature, thereby compacting the mixture of the ash and the low-temperature melting salt.

The auxiliary salts are low-temperature melting salts. By low-temperature melting salt, it is meant a salt that has a lower melting point than the inorganic materials and salts typically present in the ash. The primary constituent of motor ash is typically calcium sulfate, which has a melting point of 1460° C. The low-temperature melting salts of the present invention may have a melting point of about 1000° C. or lower, such as lower than about 900° C. or lower than about 800° C.

The low-temperature melting salt may comprise at least one cationic component and at least one anionic component. The at least one cationic component may be selected from lithium ($Li^+$), sodium ($Na^+$), potassium ($K^+$), rubidium ($Rb^+$), caesium ($Cs^+$), calcium ($Ca^{2+}$) or ammonium ($NH_4^+$) ions. The at least one anionic component may be selected from fluoride ($F^-$), chloride ($Cl^-$), bromide ($Br^-$), iodide ($I^-$) nitrate ($NO_3^-$), or sulfate ($SO_4^{2-}$) ions. The low-temperature melting salt may comprise further cations or anions other than those listed above. For example, a proton ($H^+$) may be present as a cation in salts having a divalent anion, e.g. $NaHSO_4$.

Suitable salts include, but are not limited to lithium fluoride, lithium chloride, lithium bromide, lithium iodide, lithium nitrate, lithium sulfate, sodium fluoride, sodium chloride, sodium bromide, sodium iodide, sodium nitrate, sodium sulfate, potassium fluoride, potassium chloride, potassium bromide, potassium iodide, potassium nitrate, potassium sulfate, rubidium fluoride, rubidium chloride, rubidium bromide, rubidium iodide, rubidium nitrate, rubidium sulfate, caesium fluoride, caesium chloride, caesium bromide, caesium iodide, caesium nitrate, caesium sulfate, calcium fluoride, calcium chloride, calcium bromide, calcium iodide, calcium nitrate, calcium sulfate, ammonium fluoride, ammonium chloride, ammonium bromide, ammonium iodide, ammonium nitrate or ammonium sulfate. For example, the low-temperature melting salt may be an alkali metal halide, as alkali metal halides are cheap, readily available and provide a good compaction effect at temperatures substantially lower than that of ash alone.

Mixtures of one or more low-temperature melting salts may be used, such as a binary mixture of salts or ternary mixture of salts. For example, mixtures of sodium-, potassium- and/or calcium nitrates have low melting points, in some cases as low as 131° C., and are well studied in the context of thermal storage applications. Mixtures of such nitrates may be used.

Without wishing to be bound by theory, it is observed that the low-temperature melting salt assists in the compaction and redistribution of the typical ash inorganic matter. This may be due to a number of effects. The low-melting salt may act as a sintering aid to the ash inorganic matter, thus causing the ash to sinter at lower exhaust temperatures. The low-melting salt may form an eutectic composition with the ash, thus lowering the overall melting point of the ash/salt composition. The low-temperature melting salt may assist in the conglomeration and/or packing of the ash.

The low-temperature melting salt may be added to non-compacted ash in quantities of from about 0.2 weight % to about 20 weight %, relative to the dry weight of uncompacted ash deposited in the particulate filter. Preferably, the low-temperature melting salt is added in quantities sufficient to induce compaction and redistribution of the ash without loading the particulate filter with unnecessarily large quantities of inorganic materials.

Upon depositing the low-temperature melting salt on the particulate filter, the temperature of the particulate filter is brought to a compacting temperature in order to compact and redistribute the deposited ash/salt mixture. By compaction temperature it is meant any temperature equal to or above the minimum compaction temperature. The minimum compaction temperature is the lowest temperature at which the compaction of the ash/salt mixture occurs on the particulate filter.

Depending on the minimum compaction temperature, the particulate filter may be brought to a compaction temperature by routine operation of the vehicle, without any particular measures to raise the temperature of the particulate filter. The particulate filter may be brought to a compaction temperature by heat-generating measures taken during regular passive regeneration of the particulate filter, irrespective of the ash loading of the filter. If relatively high compaction temperatures are required, active measures to raise the temperature of the particulate filter may be performed.

Depending on how the low-temperature melting salt is dosed to the particulate filter, the step of increasing the temperature may vary. For example, if the low-temperature melting salt is dosed discretely, for example using a salt dosing unit located in the exhaust system, then the temperature increase may be timed to coincide or correspond with the dosing of the low-temperature melting salt. If the low-temperature melting salt is dosed continuously, for example by dispersion in the engine oil, then the temperature increase may be initiated by another parameter, e.g. the temperature may be increased periodically, or whenever the pressure drop across the particulate filter increases above a threshold level.

The temperature of the particulate filter may be raised using any means known in the art. For example, if a diesel oxidation catalyst (DOC) is arranged upstream of the particulate filter, or if the particulate filter is itself catalysed (e.g. a catalysed soot filter, CSF), then the temperature may be raised by exothermic oxidation of hydrocarbons in the exhaust stream. Hydrocarbons may be introduced into the exhaust stream by a specific injector in the exhaust system or by controlling the timing of the engine valves to allow uncombusted fuel to pass through to the exhaust stream. The temperature in the exhaust system may also be raised by controlling the engine to produce a hotter exhaust stream. The particulate filter may also be specifically heated, for example by incorporation of a heating element in the housing of the filter.

The compaction temperature required to achieve sufficient compacting of the low-temperature melting salt/ash mixture may depend on a number of factors including the nature of the low-temperature melting salt, the exhaust volume flow, the duration that the particulate filter is subjected to the compaction temperature, the salt-to-ash ratio and the ash loading of the particulate filter. The minimum compaction temperature may be from about 300° C. to about 700° C. Preferably, the minimum compaction temperature may be from about 300° C. to about 600° C., such as from about 400° C. to about 500° C. As a reference, the typical temperature required for active regeneration of a particulate filter, whereby soot is removed using oxygen as the primary oxidant, is 600° C. Preferably the minimum compaction temperature is below the temperature required for active regeneration.

A number of different means of introducing the low-temperature melting salt to the particulate filter are foreseen. Put simply, the low-temperature melting salt may be introduced into any material flow that ultimately leads to the particulate filter. In a typical engine system this includes introduction into the fuel, the intake air, the engine lubrication oil or the exhaust gases. Combinations of such means of depositing the low-temperature melting salt on the particulate filter may also be used.

An engine lubrication oil comprising the low-temperature melting salt may be manufactured. For example, particles of the low-temperature melting salt may be dispersed in a lubrication oil used for lubrication of an engine, such as a multi-grade synthetic oil. The low-temperature melting salt may be present in the oil in amounts of from about 10 ppm to about 1000 ppm by mass.

Figure 7:
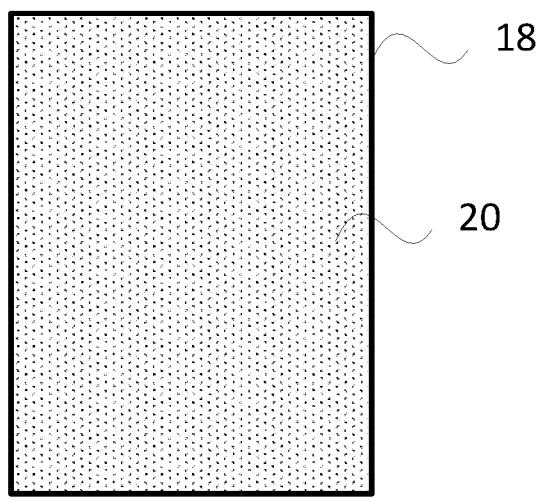
FIG. 7 schematically illustrates a solid matrix with a low-temperature melting salt dosage dispersed in the solid matrix.

As an alternative to manufacturing a specific engine oil for the purpose of the invention, a discrete dosage form may be prepared for addition to engine oils that already are commercially available. As illustrated in FIG. 7, this low-temperature melting salt dosage product may take the form of a low-temperature melting salt 20 dispersed in a solid matrix 18, such as a wax. The solid matrix 18 may dissolve upon submersion in the engine oil, thereby rapidly providing a dispersion of the low-temperature melting salt 20 in the engine oil. Alternatively, the solid matrix 18 may be a controlled-release matrix allowing for a slow, continuous release of low-temperature melting salt into the oil at the conditions prevailing in the engine lubricant system. Such a controlled-release matrix material may comprise a lipophilic solid such as a wax that has a melting point in excess of the temperature prevailing within the engine lubrication system. For example, thermostat waxes may be suitable as a controlled-release matrix. Erosion and/or dissolution of the matrix releases the low-temperature melting salt into the engine oil in a controlled fashion over an extended time period.

The low-temperature melting salt may be provided dispersed in the fuel of the vehicle. For example, a diesel fuel comprising dispersed low-temperature melting salt may be manufactured, or the low-temperature melting salt may be added as an additive to a commercially available fuel.

An engine system of a vehicle may be adapted to provide for dosing of the low-temperature melting salt at one or more points in the system. The engine system of a vehicle typically comprises at least the following systems and/or components: an internal combustion engine; a fuel supply system; an air intake system; a lubrication system and an exhaust gas system. Any of the listed components and/or systems may be adapted to provide for dosing of the low-temperature melting salt. Depending on the nature of the salt used and the temperature prevailing in the relevant system and/or component, the low-temperature melting salt may be dosed in a variety of forms. For example, salts having a melting point of lower than 200° C., such as a mixture of sodium, potassium and calcium nitrates having a melting point of 131° C., may be dosed in a pure form as a molten salt. Salts having a higher melting point may be dosed as powders using a metering device, or may be dosed as aqueous solutions by injector.

For example, an injector may be arranged in the intake manifold of a vehicle in order to inject an aqueous solution of a low-temperature melting salt. An injector may be arranged in the exhaust conduit of a vehicle upstream of the particulate filter in order inject an aqueous solution of a low-temperature melting salt directly to the exhaust stream. A powder metering device may be arranged to provide low-temperature melting salt as a powder to the oil sump of a vehicle. A solids metering device may be arranged in conjunction with the oil sump of a vehicle in order to provide low-temperature melting salt as a powder to the engine oil. A powder metering device may be arranged in conjunction with the return line of a fuel common-rail in order to provide low-temperature melting salt as a powder to the fuel.

The invention will now be described in more detail with reference to certain exemplifying embodiments and the drawings. However, the invention is not limited to the exemplifying embodiments discussed herein and/or shown in the drawings, but may be varied within the scope of the appended claims. Furthermore, the drawings shall not be considered drawn to scale as some features may be exaggerated in order to more clearly illustrate certain features.

FIG. 1 depicts a vehicle 1, here in the form of a truck, in a schematic side view. The vehicle may however be any other motor driven vehicle, for example a bus, a watercraft, or a passenger car. The vehicle comprises a combustion engine 2 which powers the vehicle's tractive wheels 3 via a gearbox (not shown) and a propeller shaft (not shown). The engine 2 is provided with an exhaust gas treatment system comprising a particulate filter 4. The engine 2 is powered by fuel supplied to it via a fuel system which comprises a fuel tank 5. An air intake system comprising an intake manifold 6 provides air to the combustion engine 2. An engine lubrication system 8 supplies lubricant to the moving parts of the engine 2.

Figure 2:
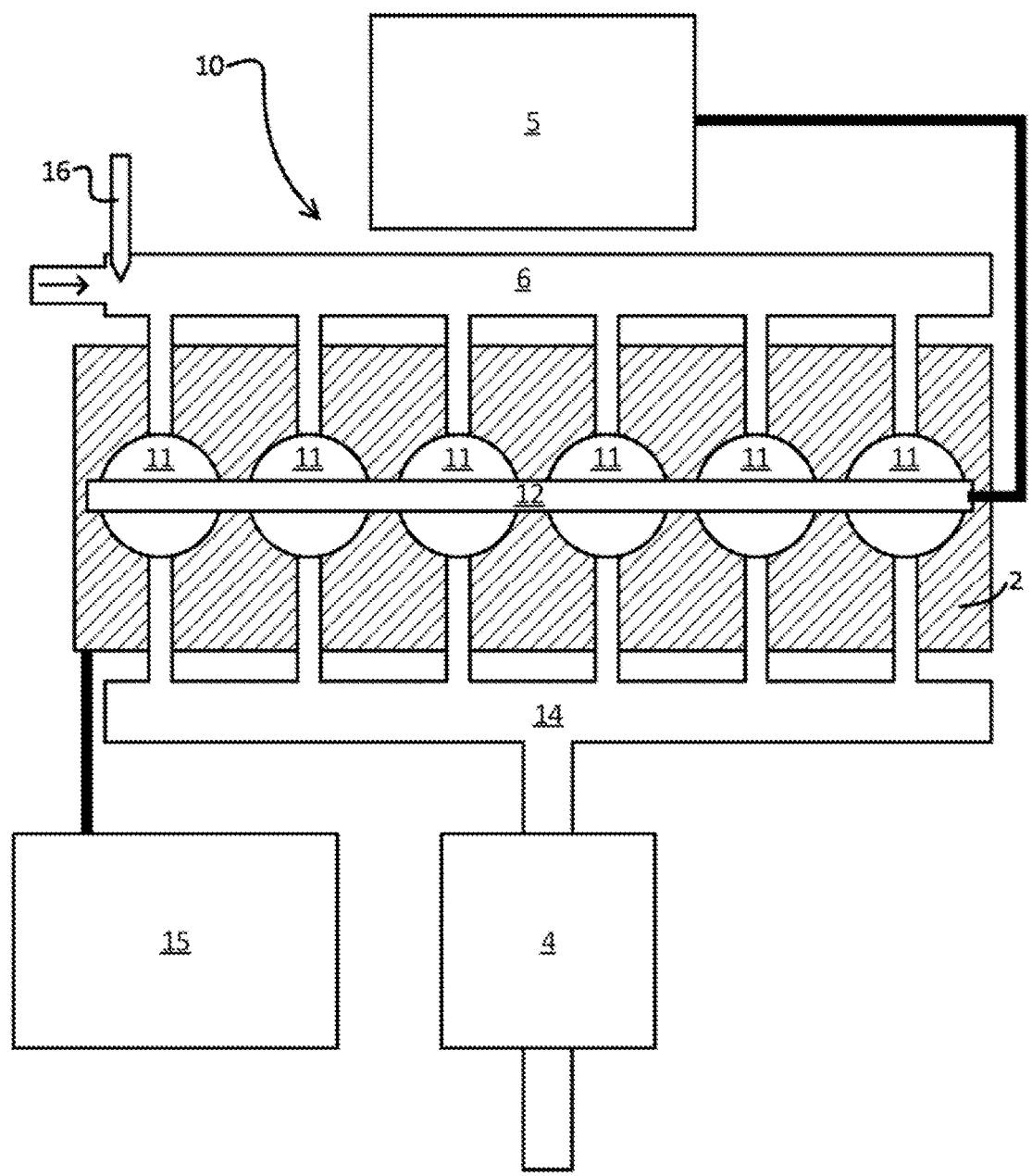
FIG. 2 schematically illustrates an engine system having a salt dosing unit arranged in the inlet manifold.

FIG. 2 depicts schematically an engine system 10 according to the present invention. The engine system 10 comprises an internal combustion engine 2 having combustion cylinders 11. An intake manifold 6 provides air to the internal combustion engine 2, and a fuel common rail 12 supplies fuel to the cylinders 11 from fuel tank 5. Exhaust gases resulting from combustion of the fuel are collected by the exhaust manifold 14 and conveyed to particulate filter 4. A lubricant system 15 provides lubricant to the components of the engine 2. A salt dosing unit 16, here illustrated as an injector for injecting a salt solution, is arranged in the intake manifold 6 dosing of the low-temperature melting salt to the intake air. Salt supplied to the intake air manifold 6 will be conveyed via the combustion cylinders 11 and exhaust manifold 14 to the particulate filter 4. Once deposited on the particulate filter the salt will assist in compacting and redistributing any ash deposited in the particulate filter 4.

Figure 3:
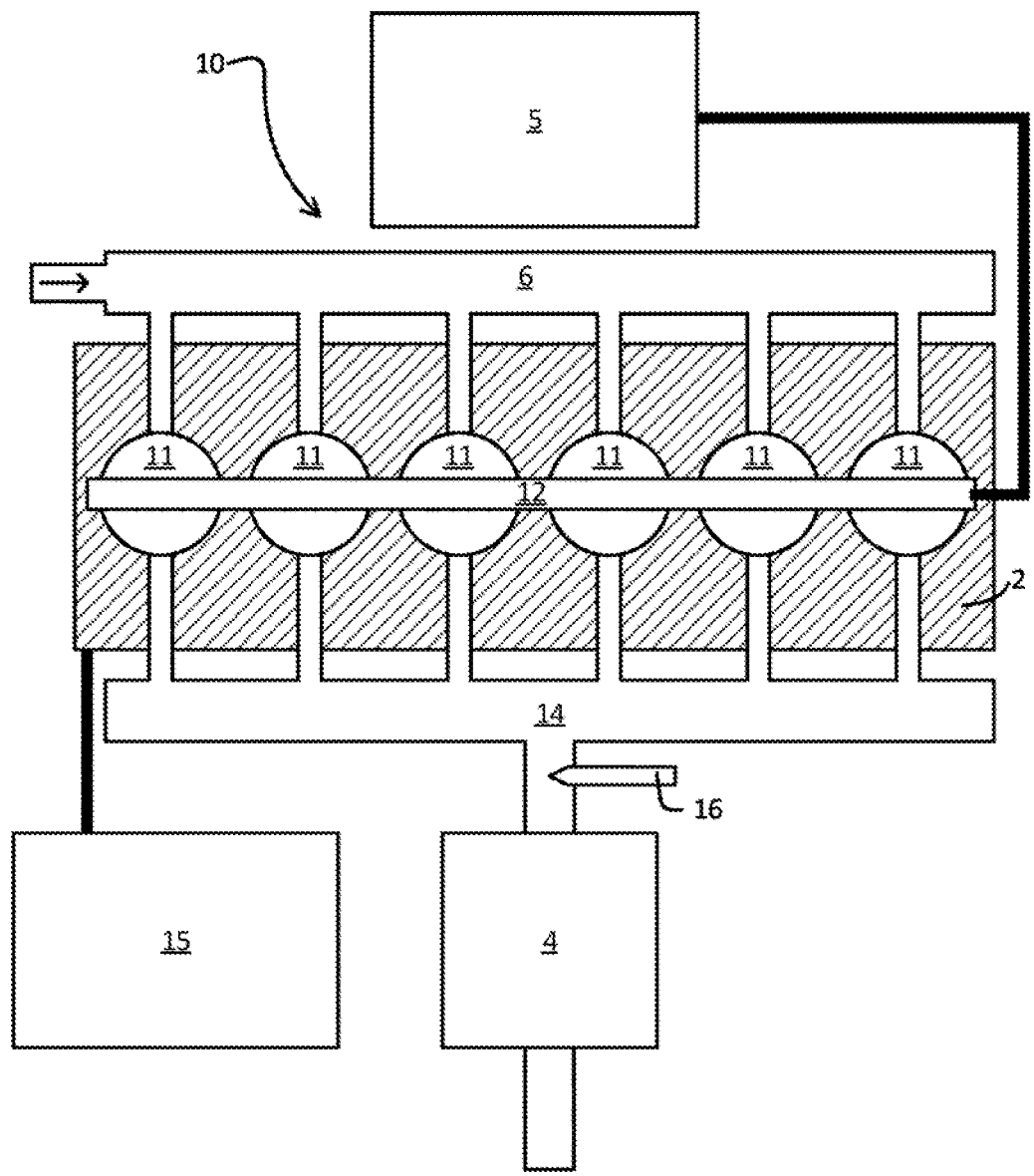
FIG. 3 schematically illustrates an engine system having a salt dosing unit arranged in the outlet manifold.

FIG. 3 schematically depicts an engine system 10 similar to that of FIG. 2. However, here the salt dosing unit 16 is arranged in conjunction with the exhaust manifold 14. The engine components are therefore not exposed to the potentially corrosive salt, and the salt is not subjected to the highly oxidizing conditions prevailing in the combustion cylinders 11.

Figure 4:
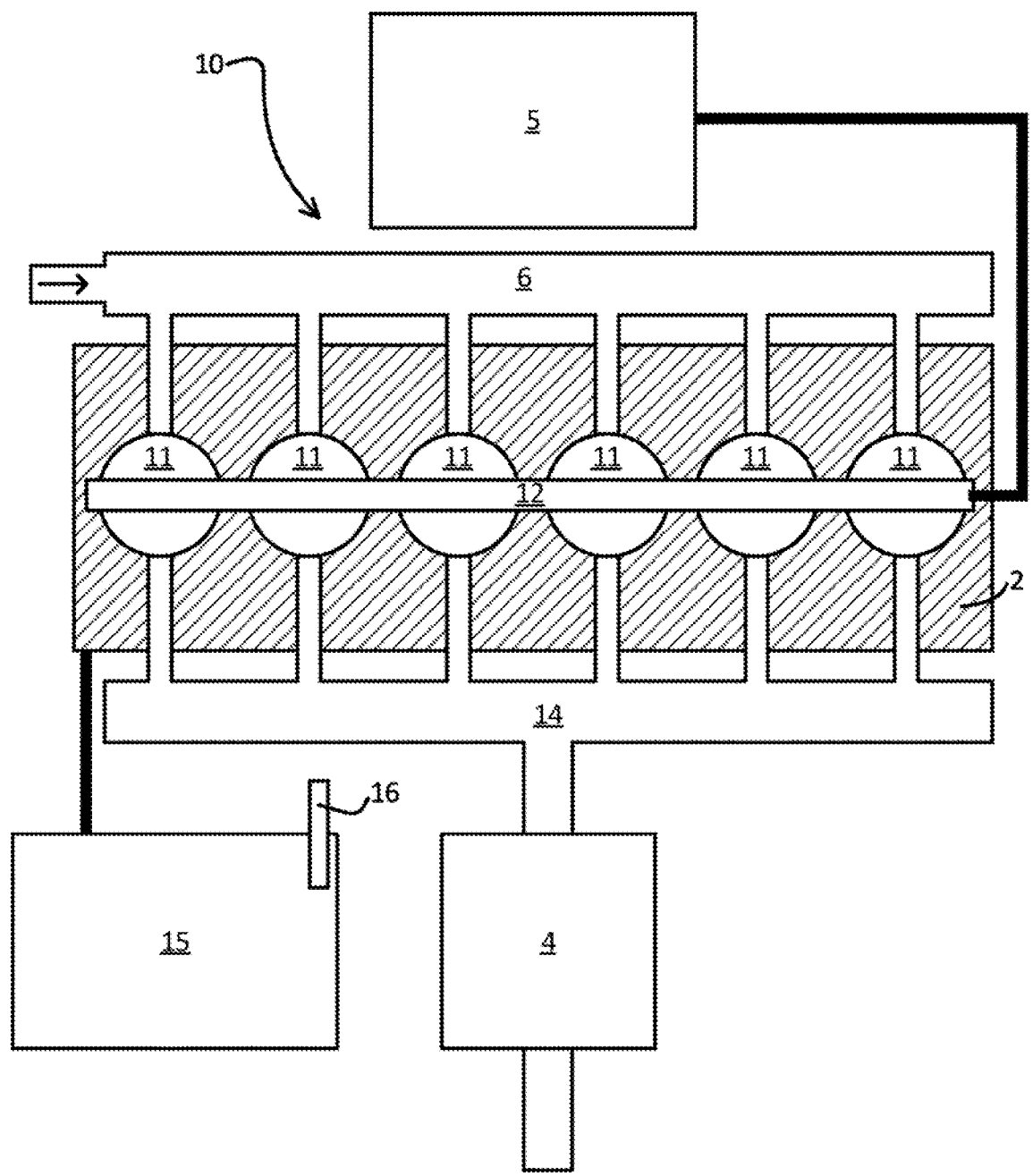
FIG. 4 schematically illustrates an engine system having a salt dosing unit arranged in the engine oil system.

FIG. 4 schematically depicts an engine system 10 similar to that of FIGS. 2 and 3. However, here the salt dosing unit 16 is a powder feeder arranged in conjunction with the lubricant system 15.

Figure 5:
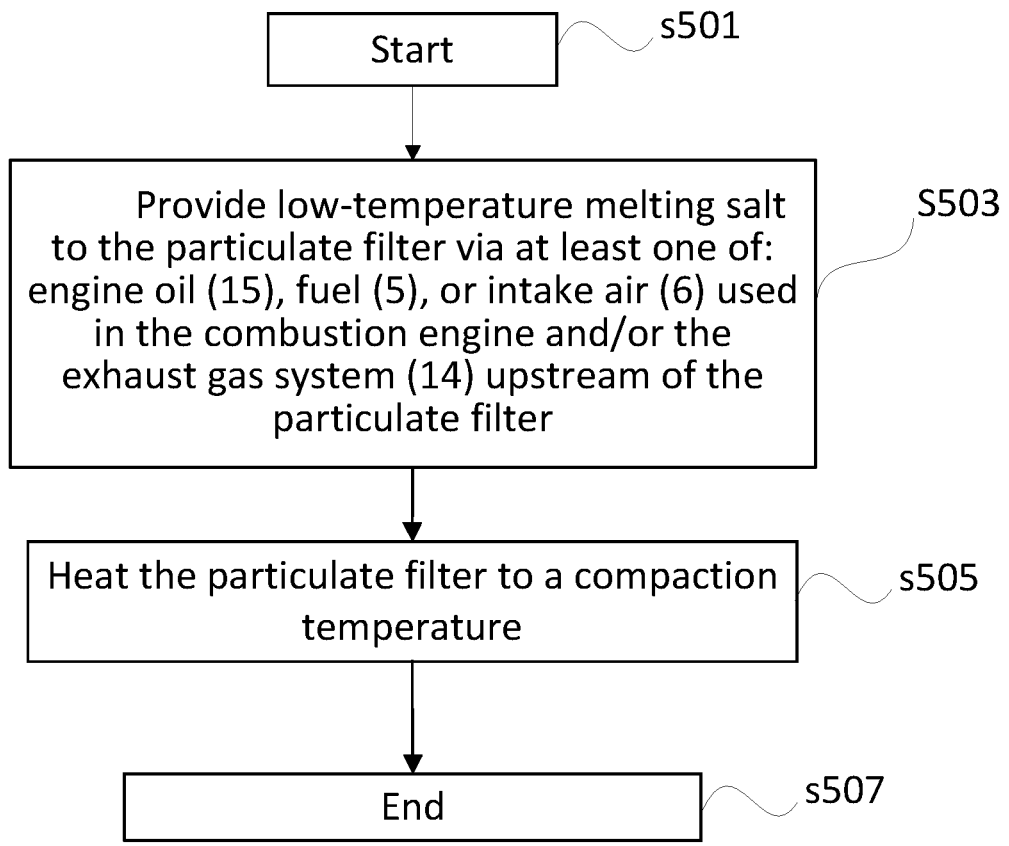
FIG. 5 is a process flow chart illustrating the method of compacting an ash deposited in a particulate filter.

FIG. 5 depicts schematically a process flow chart for the method of compacting an ash deposited in a particulate filter according to the present invention. Step s501 denotes the start of the method. In step s503 the low-temperature melting salt is provided to the particulate filter, for example using one of the means described above. In this manner, a mixture of ash and the low-temperature melting salt is formed in the particulate filter. In step s505 the particulate filter is brought to a compaction temperature, for example using one of the means described above, thereby compacting the mixture of the ash and the low-temperature melting salt. Step s507 denotes the end of the method.

EXAMPLES

The ability of various low-temperature melting salts and mixtures of salts to facilitate compaction of ash was tested. Calcium sulphate, (CaSO4, powder, anhydrous, 99%, Alfa Aesar) was used as the model ash. Each sample was prepared by adding a salt mixture to a calcium sulphate base in a quantity of 1 weight % relative to the weight of the calcium sulphate. Where a binary salt mixture was tested, the two components were mixed in eutectic proportions. As a further reference, a sample having 20 weight % of zinc phosphate in calcium sulphate was prepared and tested. Both zinc salts and phosphates are known to be further commonly occurring constituents of ash deriving from lubrication oil.

Figure 6:
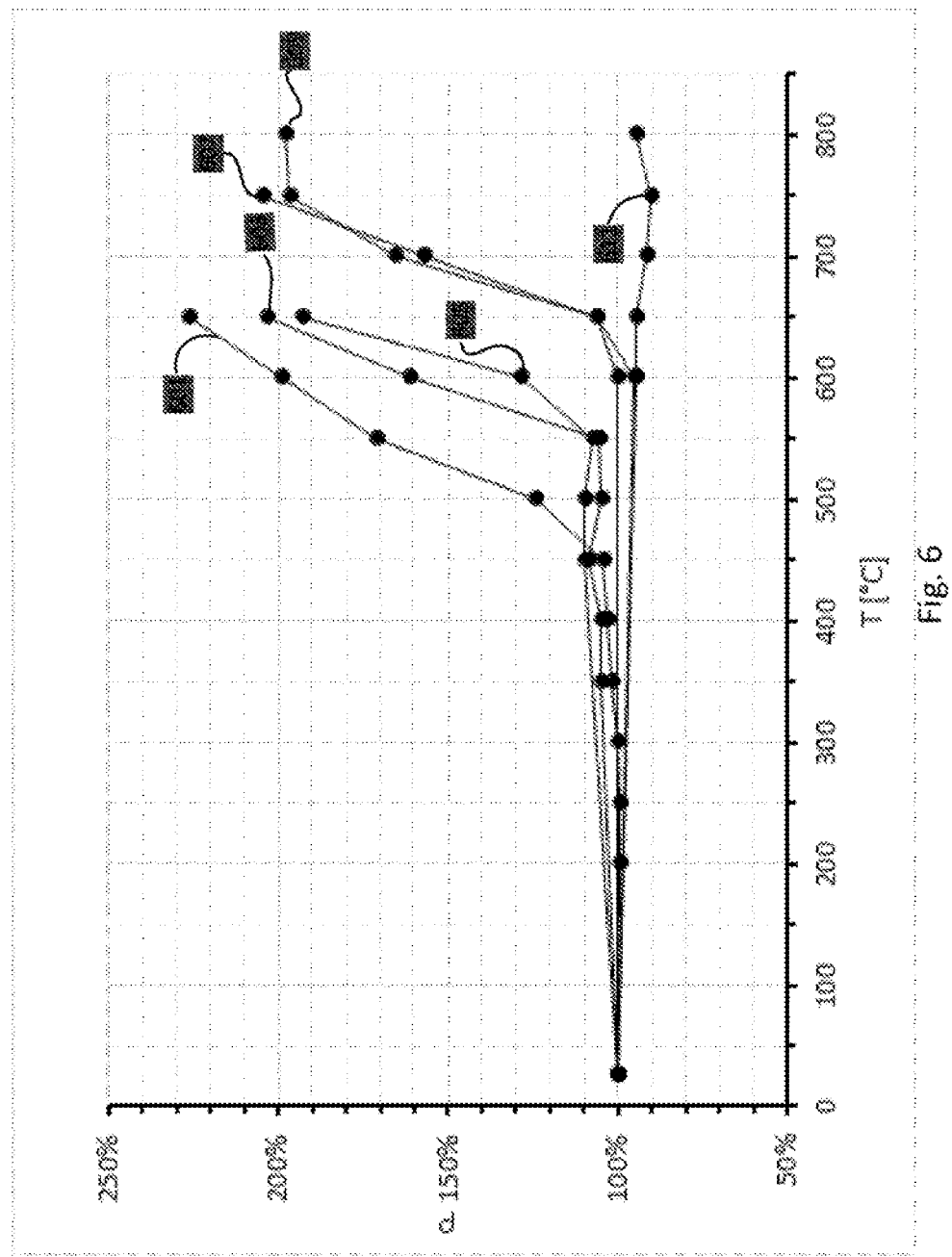
FIG. 6 is a graph illustrating the effect of various low-temperature melting salts on the compaction of a model ash compound.

For testing, ca. 5 to 15 g of each sample was placed in a ceramic crucible and heated at a temperature gradient of 10° C./min. The average density of each sample was recorded at various temperatures and a graph of relative density p expressed as a percentage of the original density (y-axis) as a function of temperature T in ° C. (x-axis) was constructed. This graph is shown in FIG. 6, and the constitution of each sample tested is shown in the Table below.

| Sample Constitution | Line identifier. (FIG. 6) |
| --- | --- |
| 1 wt % KCl—LiCl in $CaSO_4$ | 601 |
| 1 wt % KCl—$Na_2SO_4$ in $CaSO_4$ | 603 |
| 1 wt % NaCl—$Na_2SO_4$ in $CaSO_4$ | 605 |
| 1 wt % KCl in $CaSO_4$ | 607 |
| 1 wt % NaCl in $CaSO_4$ | 609 |
| 20 wt % $Zn_3(PO_4)_2$ in $CaSO_4$ | 611 |

Pure calcium sulphate demonstrated little or no compaction at all in the temperature window of up to 800° C. (not shown in graph). Similarly, the other model ash sample without a low-temperature metal salt, 20 weight % zinc phosphate in calcium sulphate (line 611) didn't show any increase in density at temperatures of up to 800° C. All samples comprising calcium sulphate with added low-temperature melting salt (lines 601, 603, 605, 607 and 609) demonstrated an increase in density as the temperature was raised. The temperature for onset of the density increase varied between the samples. The sample having 1 wt % KCl—LiCl in $CaSO_4$ showed the lowest temperature for onset of compaction, i.e. minimum compaction temperature, at about 450° C. Lithium chloride (LiCl) has the lowest melting point (605° C.) of all salts tested.

The experiments clearly demonstrate that small quantities (1 weight %) of added low-temperature melting salt may substantially reduce the temperature at which compaction of the sample is initiated.

The invention claimed is:

1. A low-temperature melting salt dosage product comprising a low-temperature melting salt comprising at least one cationic component and at least one anionic component, wherein the at least one cationic component is lithium ($Li^+$), sodium ($Na^+$), potassium ($K^+$), rubidium ($Rb^+$), caesium ($Cs^+$), calcium ($Ca^{2+}$) or ammonium ($NH_4^+$) ion, and the at least one anionic component is fluoride ($F^-$), chloride ($Cl^-$), bromide ($Br^-$), iodide ($I^-$), nitrate ($NO_3^-$), or sulphate ($SO_4^{2-}$) ion, where the low-temperature melting salt is dispersed in a solid material, wherein the low-temperature melting salt dosage product is used to compact ash in a particulate filter of a vehicle exhaust gas system associated with an internal combustion engine.

2. The low-temperature melting salt dosage product according to claim 1, wherein the solid material has a melting point that is a temperature in a range of 50° C. to 100° C.

3. The low-temperature melting salt dosage product according to claim 1, wherein the solid material has a melting point that is a temperature above 100° C.

4. An oil for use as a lubricant in a combustion engine, wherein when the oil is consumed in the combustion engine, the oil releases low-temperature melting salt into a vehicle exhaust gas system associated with the combustion engine, where the low-temperature melting salt is used to compact ash in a particulate filter of the vehicle exhaust gas system, the oil comprising:
    a base lubrication oil; and
    a low-temperature melting salt dispersed in the base lubrication oil, the low temperature melting salt comprising at least one cationic component and at least one anionic component, wherein the at least one cationic component lithium ($Li^+$), sodium ($Na^+$), potassium ($K^+$), rubidium ($Rb^+$), caesium ($Cs^+$), calcium ($Ca^{2+}$) or ammonium ($NH_4^+$) ion, and the at least one anionic component is fluoride ($F^-$), chloride ($Cl^-$), bromide ($Br^-$), iodide ($I^-$), nitrate ($NO_3^-$), or sulphate ($SO_4^{2-}$) ion, wherein when heated releases the low-temperature melting salt into the exhaust gas system and is thereby used to compact ash in the particulate filter of the exhaust system.

5. The oil according to claim 4, wherein the base lubrication oil is a multi-grade synthetic oil.

6. A method of compacting an ash deposited in a particulate filter for a vehicle exhaust gas system associated with a combustion engine, the method comprising the steps of:
    a) providing a low-temperature melting salt to the particulate filter via the vehicle exhaust gas system during an operation of the combustion engine, whereby the low-temperature melting salt forms a mixture with the ash in the particulate filter,
        wherein the low-temperature melting salt comprises at least one cationic component and at least one anionic component, wherein the at least one cationic component is lithium ($Li^+$), sodium ($Na^+$), potassium ($K^+$), rubidium ($Rb^+$), caesium ($Cs^+$), calcium ($Ca^{2+}$) or ammonium ($NH_4^+$) ion, and the at least one anionic component is fluoride ($F^-$), chloride ($Cl^-$), bromide ($Br^-$), iodide ($I^-$), nitrate ($NO_3^-$), or sulphate ($SO_4^{2-}$) ion; and
    b) heating the particulate filter, by at least one of raising a temperature of an exhaust steam or using a heating element, to a selected compaction temperature, at which selected compaction salt the mixture of the ash and the low-temperature melting salt to compact in the particulate filter.

7. The method according to claim 6, wherein the step a) of providing a low-temperature melting salt to the particulate filter via the vehicle exhaust gas system is achieved by at least one of the following operations upstream of the particulate filter when the combustion engine is in operation:
    dosing the low-temperature melting salt to an oil used in a combustion engine associated with the vehicle exhaust gas system;
    dosing the low-temperature melting salt to a fuel used in the combustion engine;
    dosing the low-temperature melting salt to an intake air used in the combustion engine; or
    dosing the low-temperature melting salt to the vehicle exhaust gas system upstream of the particulate filter,
    such that when the combustion engine is in operation, the low-temperature melting salt is thereby provided to the particulate filter via the vehicle exhaust gas system.

8. The method according to claim 7, wherein providing a low-temperature melting salt to the particulate filter comprises providing the low-temperature melting salt via the vehicle exhaust gas system when the combustion engine is in operation as a powder, a solid-in-solid dispersion, a solid-in-liquid dispersion, and/or a molten salt.

9. The method according to claim 6, wherein providing a low-temperature melting salt to the particulate filter comprises providing the low-temperature melting salt which has a melting point temperature that is a temperature in a range of 100° C. to 1000° C.

10. The method according to claim 6, wherein providing a low-temperature melting salt to the particulate filter comprises providing the low-temperature melting salt to the particulate filter in an amount in a range of 0.2 weight % to 20 weight %, relative to the dry weight of uncompacted ash deposited in the particulate filter.

11. The method according to claim 6, wherein heating the particulate filter to the selected compaction temperature comprises heating the particulate filter to a temperature selected from a range of 300° C. to 700° C.

12. The method according to claim 6, wherein heating the particulate filter to the selected compaction temperature comprises heating the particulate filter to a temperature temperature selected from a range of 400° C. to 500° C.

13. A vehicle comprising: an internal combustion engine; an exhaust gas system arranged to convey exhaust gases from the internal combustion engine, the exhaust gas system comprising a particulate filter for trapping ash and/or soot dispersed in the exhaust gases; and an oil for use as a lubricant in the internal combustion engine, said oil comprising:
    a base lubrication oil; and
    a low-temperature melting salt dispersed in the base lubrication oil, the low-temperature melting salt comprising at least one cationic component and at least one anionic component, wherein the at least one cationic component is lithium ($Li^+$), sodium ($Na^+$), potassium ($K^+$), rubidium ($Rb^+$), caesium ($Cs^+$), calcium ($Ca^{2+}$) or ammonium ($NH_4^+$) ion, and the at least one anionic component is fluoride ($F^-$), chloride ($Cl^-$), bromide ($Br^-$), iodide ($I^-$), nitrate ($NO_3^-$), or sulphate ($SO_4^{2-}$) ion, wherein when heated releases the low-temperature melting salt into the exhaust gas system and is thereby used to compact ash in the particulate filter of the exhaust system.

14. An engine system for a vehicle, the engine system comprising:
    an internal combustion engine arranged to be operated by combustion of a fuel in intake air, arranged to be lubricated by means of an engine oil, and arranged to generate exhaust gases upon combustion of a fuel;

a fuel supply system arranged to convey the fuel to the internal combustion engine;

an air intake system arranged to convey intake air to the internal combustion engine;

a lubrication system arranged to convey the engine oil to the internal combustion engine;

an exhaust gas system arranged to convey the exhaust gases from the internal combustion engine, the exhaust gas system comprising a particulate filter for trapping ash and/or soot dispersed in the exhaust gases; and a salt dosing unit arranged to provide a low-temperature melting salt to the particulate filter, where the low-temperature melting salt comprises at least one cationic component and at least one anionic component, wherein the at least one cationic component is lithium ($Li^+$), sodium ($Na^+$), potassium ($K^+$), rubidium ($Rb^+$), caesium ($Cs^+$), calcium ($Ca^{2+}$) or ammonium ($NH_4^+$) ion, and the at least one anionic component is fluoride ($F^-$), chloride ($Cl^-$), bromide ($Br^-$), iodide ($I^-$), nitrate ($NO_3^-$), or sulphate ($SO_4^{2-}$) ion; wherein when heated releases the low-temperature melting salt into the exhaust gas system and is thereby used to compact ash in the particulate filter of the exhaust system.

15. The engine system according to claim 14, wherein the salt dosing unit is arranged to dose the low-temperature melting salt as a powder, a solid-in-solid dispersion, a solid-in-liquid dispersion or a molten salt.

\* \* \* \* \*